US012158729B2

(12) United States Patent
Le Loarer et al.

(10) Patent No.: US 12,158,729 B2
(45) Date of Patent: Dec. 3, 2024

(54) CASE ELEMENT FOR A TIMEPIECE COMPRISING A PUSHBUTTON MADE OF BULK METALLIC GLASS

(71) Applicant: MANUFACTURE D'HORLOGERIE AUDEMARS PIGUET SA, Le Brassus (CH)

(72) Inventors: Thibaut Le Loarer, Chavannaz (FR); Sandra Guadalupe Maldonado, Romainmôtier (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 288 days.

(21) Appl. No.: 17/685,737

(22) Filed: Mar. 3, 2022

(65) Prior Publication Data

US 2022/0291636 A1 Sep. 15, 2022

(30) Foreign Application Priority Data

Mar. 10, 2021 (CH) ........................................ 257/21

(51) Int. Cl.
*G04B 37/10* (2006.01)
*G04B 37/22* (2006.01)

(52) U.S. Cl.
CPC ........... *G04B 37/106* (2013.01); *G04B 37/22* (2013.01)

(58) Field of Classification Search
CPC ...... G04B 37/106; G04B 37/22; G04B 3/048; G04B 37/10; G04C 3/001; H01H 25/06; H01H 25/065
See application file for complete search history.

(56) References Cited

U.S. PATENT DOCUMENTS 3,621,649 A * 11/1971 Vulcan et al. ......... G04B 37/10 968/339
3,767,875 A * 10/1973 Schneikart ............. H01H 13/12 968/914

(Continued)

FOREIGN PATENT DOCUMENTS

| | | | |
|---|---|---|---|
| EP | 3 276 432 | 1/2018 | |
| GB | 2077506 A * | 12/1981 | ............. G04C 3/001 |
| WO | 2011/161195 | 12/2011 | |

OTHER PUBLICATIONS

Search Report for CH2572021 dated Jun. 29, 2021, 3 pages.

*Primary Examiner* — Edwin A. Leon
(74) *Attorney, Agent, or Firm* — NIXON & VANDERHYE

(57) ABSTRACT

A case element for a timepiece is described, having a through-hole and bearing a pushbutton including a tube, that is accommodated inside the through-hole and is closed by an actuating surface at its end oriented towards the outside, the actuating surface being intended to be pressed by a user in order to actuate a timepiece mechanism arranged inside the case element, wherein the pushbutton is made in one piece, of a bulk metallic glass, and further includes a connection surface which is arranged against the case element so as to establish a permanent, water-resistant connection with the latter, and wherein the actuating surface is able to move, with respect to the connection surface, in response to a pressure exerted thereon by the user. A corresponding production method is also described.

34 Claims, 2 Drawing Sheets

(56) References Cited

U.S. PATENT DOCUMENTS

| | | | | |
|---|---|---|---|---|
| 3,982,089 | A * | 9/1976 | Hyltin .................... | H01H 13/12<br>200/512 |
| 5,258,592 | A * | 11/1993 | Nishikawa ........... | H01H 13/063<br>200/302.2 |
| 8,138,434 | B2 * | 3/2012 | Tang ...................... | H01H 13/06<br>200/302.2 |
| 10,290,440 | B2 * | 5/2019 | Teplitxky ............... | H01H 13/06 |
| 2003/0174590 | A1 * | 9/2003 | Arikawa .............. | G04B 37/106<br>368/319 |
| 2020/0125034 | A1 | 4/2020 | Takasawa et al. | |

* cited by examiner

CASE ELEMENT FOR A TIMEPIECE COMPRISING A PUSHBUTTON MADE OF BULK METALLIC GLASS

This application is claims priority to CH 00257/21 filed Mar. 10, 2021, the entire contents of which is hereby incorporated by reference.

BACKGROUND OF THE INVENTION

Field of the Invention

The present invention relates to a case element for a timepiece, comprising an inner wall and an outer wall and having a through-hole extending between said inner wall and outer wall, the case element bearing a pushbutton comprising a tube that is at least partially accommodated inside the through-hole and is closed by an actuating surface at its end oriented towards the outside of the case element, the actuating surface being intended to be pressed by a user in order to actuate a timepiece mechanism that can be arranged inside the case element.

According to one preferred embodiment, the case element according to the present invention may be a middle for a timepiece.

The present invention also relates to a timepiece comprising such a case element, and to a method for producing a case element according to the invention.

Description of the Related Art

Case elements, in particular middles, of this type are already known in the prior art. Nowadays, the majority of timepieces on the market have a minimum level of water-resistance, allowing them to withstand being splashed with water, or even in some cases allowing them to be submerged to great depths. Hence, the cases of these timepieces must be rendered water-resistant, in particular at the sensitive regions represented by the passages for the external control members such as the control pushbuttons and crowns.

Typically, in order to mount such a control member on a case element, for example a middle or a back-middle, use is made of a main tube which is secured to the corresponding case element in a water-resistant manner, in particular by welding, brazing or adhesive bonding. The control member is then joined to an additional tube or a control stem, this being accommodated inside the main tube. Generally, multiple seals, either O-ring or lip-type seals, are arranged between the main tube and the additional tube and/or the control stem in order to seal the inside of the main tube. This results not only in complex assemblies but also in constraints owing to the necessary periodic maintenance, in particular the periodic replacement of the seals, which over time lose their elastic properties and dry out.

Various alternative solutions have already been proposed in order to simplify the assembly of the control members while ensuring the water-resistance thereof and/or in order to simplify the maintenance thereof over time.

For example, the creation of a middle made of polymer material has already been proposed, with silicone inserts for the pushbuttons being moulded together with the middle in order to obtain a middle and pushbuttons created in a single piece, and hence a complete case element that is perfectly water-resistant.

Furthermore, patent application US 2020/0125034 A1 Illustrates and describes an alternative method for creating a middle comprising pushbuttons created in one piece with the middle. To that end, this application proposes moulding metallic glass to form the assembly in one piece, creating variable thicknesses according to the regions of the moulded product, in particular in order to define deformable portions at the pushbuttons.

Although a method of this kind makes it possible to simplify the production of a middle of this type, that is to say including water-resistant pushbuttons created in one piece with the middle, this simplification remains theoretical given that the corresponding moulding operation, using a metallic glass, is very delicate. Not only is the creation of the corresponding mould delicate, but also a metallic glass can crystallize in regions of greater thickness, where it cools more slowly than in the thinner regions in which it can retain its amorphous state, and this can result in internal stresses in the material at the end of the process. Consequently, the product obtained in this way can prove to be relatively fragile and much less corrosion-resistant.

Finally, the two earlier methods, mentioned above, are both limited in terms of the choice of material from which the middle is made, polymer in the first case and metallic glass in the second case. Thus, these methods are not compatible with the production of timepieces whose case might be made for example of a conventional metallic alloy such as a steel, a gold-based alloy or a titanium-based alloy.

SUMMARY OF THE INVENTION

A principal aim of the present invention is to propose a case element for a timepiece, whose construction differs from the case elements known in the prior art, and a corresponding production method that in particular makes it possible to produce cases for timepieces made of a wide variety of materials, while ensuring perfect water-resistance.

To that end, the present invention relates more particularly to a case element of the type indicated above, wherein the pushbutton is made in one piece, of a bulk metallic glass (or BMG), and may further comprise a connection surface arranged against a connection region of the case element so as to have a permanent, water-resistant connection with the case element, and wherein the pushbutton may be shaped in such a way that at least one portion of the actuating surface is able to move, with respect to the connection surface, in response to a pressure exerted by the user on the actuating surface.

Indeed, the applicant's research has shown that, against all expectations, the fact of making the production of the case element bearing a pushbutton according to the present invention more complex than in the above-mentioned prior art brings certain alternative advantages, in particular that of being able to use a case element basis that is not made of a bulk metallic glass, which the pushbutton is. Thus, this latter part is added to the case element basis, the mechanical connection between these two components being made in a permanent manner, which makes it possible to ensure perfect water-resistance between them.

Preferably, it is possible to provide that the permanent water-resistant connection may be established by direct contact between the connection surface of the pushbutton and the connection region of the case element, without a seal being interposed therebetween.

Advantageously, it is possible to provide that the tube of the pushbutton may extend as far as the inner wall of the case element and bears a base at its end located inside the case element, the base bearing the connection surface and being shaped in such a way that the connection surface presses against the inner wall of the case element all around the through-hole so as to establish the permanent water-resistant connection.

In general, it is possible to provide that the connection surface of the pushbutton may be welded, adhesively bonded or brazed onto the connection region of the case element.

Moreover, it is advantageously possible to provide that the one portion of the actuating surface that is able to move with respect to the connection surface may be secured to a stem extending towards the inside of the case element, this stem being intended to actuate the timepiece mechanism in response to a pressure exerted by the user on the actuating surface.

In general, it is advantageously possible to provide that the pushbutton may be arranged in such a way that the one portion of the actuating surface that is able to move with respect to the connection surface is able to move through a distance of between 0.1 and 1 mm, preferably between 0.2 and 0.5 mm, with respect to the case element, in response to an applied pressure of between 2 and 10 N, preferably between 3 and 5 N.

Furthermore, it can preferably be provided that at least the connection region of the case element may be made of a bulk metallic glass or of a metal taken from the group including gold or gold alloys, steels, titanium, platinum, palladium, tantalum and bronzes. Similarly, it can preferably be provided that the pushbutton may be made of a bulk metallic glass taken from the group including the bulk metallic glasses of palladium, of zirconium, of copper, of magnesium and of platinum.

In general, it can be provided that the case element according to the invention may be a middle or a back-middle.

The present invention also relates to a timepiece comprising a case element having the features stated above, and to a corresponding production method.

More specifically, the invention also relates to a method for producing a case element, for a timepiece, bearing a pushbutton having, at its end oriented towards the outside of the case element, an actuating surface that is intended to be pressed by a user in order to actuate a timepiece mechanism that can be arranged inside the case element, the mechanical connection between the case element and the pushbutton being water-resistant, wherein this method may comprise the following steps:—providing a case element comprising an inner wall and an outer wall and having a through-hole extending between said inner wall and outer wall, —creating a pushbutton made of a bulk metallic glass, in one piece, preferably by moulding and comprising a tube that is closed by the actuating surface at one of its ends and bears a connection surface which is designed to provide the connection between the pushbutton and the case element, the pushbutton being shaped in such a way that at least one portion of the actuating surface is able to move, with respect to the connection surface, in response to a pressure exerted by the user on the actuating surface, —arranging the tube of the pushbutton at least partially inside the through-hole of the case element, the actuating surface being oriented towards the outside of the case element, and the connection surface being pressed against a connection region of the case element, —securing the connection surface of the pushbutton to the connection region of the case element by creating a permanent water-resistant connection between them.

Preferably, it is possible to provide that the pushbutton may be created in such a way that the tube extends as far as the inner wall of the case element and bears a base at its end located inside the case element, the base bearing the connection surface and being shaped in such a way that the connection surface presses against the inner wall of the case element all around the through-hole so as to establish the permanent water-resistant connection.

Generally, it is possible to provide that the pushbutton may be produced simultaneously with other similar or identical pushbuttons, these being produced in the form of a batch of pushbuttons that are secured to one another via their base, the pushbuttons being subsequently split apart by implementing at least one cutting operation to separate the bases from one another.

It is advantageously possible to provide that the one portion of the actuating surface that is able to move with respect to the connection surface may be created so as to be secured to a stem extending towards the inside of the case element, this stem being intended to actuate the timepiece mechanism in response to a pressure exerted by the user on the actuating surface.

BRIEF DESCRIPTION OF THE DRAWINGS

Other features and advantages of the present invention will appear more clearly upon reading the following detailed description of a preferred embodiment, which is provided with reference to the appended drawings, which are provided by way of non-limiting example and in which.

DESCRIPTION OF THE PREFERRED EMBODIMENTS

The following detailed description aims to describe a case element for a timepiece bearing at least one pushbutton that is joined to the case element by means of a water-resistant mechanical connection, and the method for producing this, according to a preferred embodiment of the present invention, by way of an illustrative and non-limiting example.

Figure 1A:
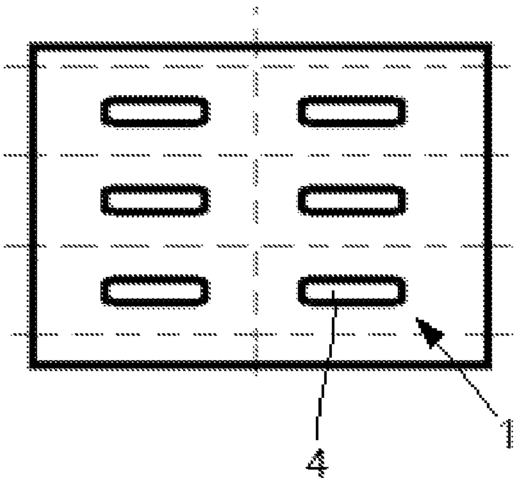
FIGS. 1*a*, 1*b* and 1*c* represent simplified schematic views, respectively a full-face view, a side view and a full-face view, illustrating steps in the production of a pushbutton that is designed to be joined to a case element basis in order to produce a case element having a pushbutton according to the present invention.
Figure 1B:
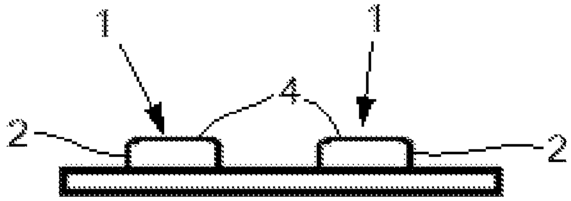
Figure 1C:
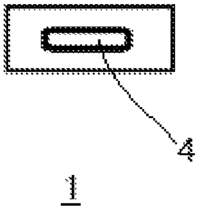

FIGS. 1*a*, 1*b* and 1*c* represent simplified schematic views, respectively a full-face view, a side view and a full-face view, illustrating general steps in the production of a pushbutton that is designed to be joined to a case element basis in order to produce a case element having a pushbutton according to the present invention. The following indications, which relate to these steps of producing the pushbutton, are provided by way of an illustrative and non-limiting example, and a person skilled in the art will be able to implement production steps that differ from those described in order to produce a pushbutton that can be joined to a case element basis in accordance with the present invention without in so doing departing from the scope thereof as defined in the appended claims.

Figure 2:
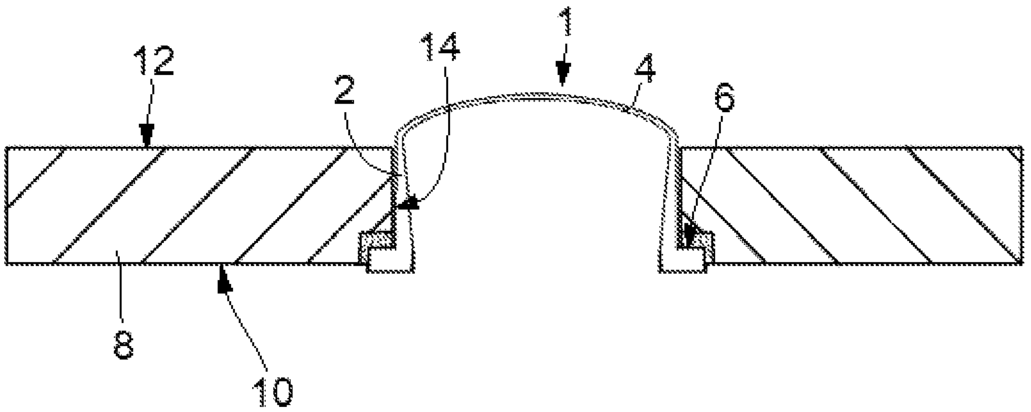
FIG. 2 shows a simplified cross-sectional view of part of a case element according to a preferred embodiment of the present invention.

In general terms, the pushbutton 1 according to the present invention is created by moulding of a bulk metallic glass, and comprises a tube 2 that is closed by an actuating surface 4 at one of its ends and that bears a connection surface 6 that is intended to provide the subsequent connection between the pushbutton 1 and a case element (reference number 8 in FIG. 2). The tube 2 can have any type of shape that is suitable for implementing the present invention, in particular a circular, oval, oblong, square or rectangular cross section.

The pushbutton is shaped in such a way that at least one portion or part of its actuating surface 4 is able to move, with respect to said connection surface 6, in response to a pressure exerted thereon by the user.

According to the preferred embodiment illustrated in the figures, the pushbutton 1 is created in such a way that its tube 2 bears a base at its end intended to be located inside the case element to which the pushbutton 1 is designed to be secured, the base bearing the connection surface 6.

Thus, in a general way, it may be advantageous to provide that the pushbutton 1 be produced simultaneously with other similar or identical pushbuttons, produced in the form of a batch of pushbuttons that are secured to one another via their base, as illustrated in FIGS. 1*a* and 1*b*.

The pushbuttons are then split apart by implementing at least one cutting operation to separate the bases from one another, so as to obtain a plurality of pushbuttons 1 as shown in FIG. 1*c*.

It is advantageously possible to provide that the pushbutton 1 be made of a bulk metallic glass taken from the group including the bulk metallic glasses of palladium, of zirconium, of copper, of magnesium and of platinum.

FIG. 2 then illustrates how the pushbutton 1 can be joined to a case element 8 according to a preferred embodiment of the present invention.

The case element 8 typically comprises an inner wall 10 and an outer wall 12, and has a through-hole 14 extending between said inner wall 10 and outer wall 12. The tube 2 of the pushbutton 1 is then at least partially accommodated inside said through-hole 14, having its actuating surface 4 located towards the outside of the case element 8.

Advantageously, the tube 2 extends essentially as far as the inner wall 10 of the case element 8, the base then being located inside the case element 8 and being shaped in such a way that the connection surface 6 presses against the inner wall 10 of the case element 8 all around the through-hole 14 so as to establish the permanent water-resistant connection.

It is optionally possible to provide for a cutaway 16 to be created in the inner wall 10, around the through-hole 14, so that the base is ultimately positioned substantially flush with the inner wall 10.

The permanent water-resistant connection is preferably established by direct contact between the connection surface 6 of the pushbutton 1 and said connection region of the case element 8, without a seal being interposed therebetween.

In general, the connection surface 6 of the pushbutton 1 is preferably welded, adhesively bonded or brazed onto the connection region of the case element 8.

Furthermore, it can be provided that at least the connection region of the case element 8, or even all of the case element 8, be made of a bulk metallic glass or of a metal taken from the group including gold or gold alloys, steels, titanium, platinum, palladium, tantalum and bronzes.

FIG. 2 shows the actuating surface 4 of the pushbutton 1 having a cross section that is thinner than the rest of the pushbutton 1, by virtue of which it is able to deform elastically to actuate a timepiece mechanism located inside the case element 8.

A person skilled in the art would have no particular difficulty in implementing any suitable alternative form for the pushbutton 1, in order to ensure that the desired result is obtained. Thus, for example, the actuating surface might be delimited by a portion of reduced thickness (this being in particular circular, oblong, square or rectangular) while its own thickness remains substantially identical to the average thickness of the rest of the pushbutton, without in so doing departing from the scope of the invention.

In general terms, it is also possible to provide that the portion of the actuating surface 4 that is able to move with respect to the connection surface 6 is secured to a stem (not shown), or created in one piece therewith, extending towards the inside of the case element 8, this stem being designed to actuate a timepiece mechanism in response to pressure exerted by the user on the actuating surface 4.

According to one preferred embodiment, it is possible to provide that the pushbutton 1 be arranged in such a way that the movable portion of its actuating surface 4 is able to move through a distance of between 0.1 and 1 mm, preferably between 0.2 and 0.5 mm, with respect to the case element 8, in response to an applied pressure of between 2 and 10 N, preferably between 3 and 5 N.

In so far as the establishment of the water-resistant permanent mechanical connection between the pushbutton 1 and the case element 8 is concerned, according to one preferred but non-limiting variant this is to be done by welding.

In this case, it is for example possible to provide for the implementation of the following operating conditions in order to carry out welding of a pushbutton 1 made of bulk metallic glass (BMG) taken from the group comprising the bulk metallic glasses of palladium, of zirconium, of copper, of magnesium and of platinum, the first line of the table indicating the material constituting the case element 8, these parameters corresponding to the use of a fibre laser source:

| | BMG | Grey gold | Ti | Steel 1.4441 | 5N gold |
|---|---|---|---|---|---|
| Time [min] | 2 | 2 | 2 | 2 | 2 |
| Power of the laser [kW] | 0.3 | 0.4 | 0.4 | 0.5 | 0.5 |
| Impact time [ms] | 0.2 | 0.3 | 0.3 | 0.3 | 0.4 |
| Impact diameter [mm] | 0.3 | 0.3 | 0.3 | 0.3 | 0.3 |
| Impact frequency [Hz] | 8 | 8 | 8 | 8 | 8 |

In particular, the applicant carried out his tests using bulk metallic glasses of palladium, of zirconium (BMG-AMZ4) and of copper (BMG-AMC4), these being available from Heraeus Group (https://www.heraeus.com/en/group/products_and_solutions_group/amorphous_metals/about_amorphous_metals/about_amorphous_metals.html).

The features presented above result in a case element for a timepiece bearing a pushbutton which is secured to the case element in a permanent and water-resistant manner without it being necessary for a seal to be interposed therebetween, having production and assembly that are simple, precise and reliable. The response of the pushbutton to the pressure exerted by a user may be adapted without any particular difficulty by adjusting the shape and thickness of the pushbutton.

The implementation of the present invention is not limited to the exact geometry, as illustrated and described, of the various components involved. Indeed, a person skilled in the art would have no particular difficulty in adapting this teaching to the implementation of a case element that matches the features of the present invention, bearing one or more pushbuttons depending on their own requirements, it being possible for the shape of the pushbuttons to be defined relatively freely provided that they are able to function as required. The actuating surface of the pushbutton may—equally—be arranged so as to either stand proud of or be set back from the outer wall of the case element, or be positioned flush with the outer wall. Thus, the pushbutton may act as a conventional pushbutton, such as a chronograph pushbutton, or may act as a corrector designed to correct the functions of the corresponding timepiece. Furthermore, if the implementation of a base is preferred, in so far as the resulting connection with the case element is more stable and robust, it can be envisaged to directly secure the tube to the wall of the through-hole of the case element without in so doing departing from the scope of the invention as defined by the appended claims.

As already stated above, the case element according to the invention may advantageously, and by way of non-limiting example, be a middle or a back-middle for a timepiece.

What is claimed is:

1. A case element for a timepiece, comprising an inner wall and an outer wall and having a through-hole extending between said inner wall and said outer wall, the case element bearing a pushbutton comprising a tube that is at least partially accommodated inside said through-hole and is closed by an actuating surface at the tube's end oriented towards the outside of the case element, said actuating surface being intended to be pressed by a user in order to actuate a timepiece mechanism that can be arranged inside the case element, wherein said pushbutton is made in one piece, of a bulk metallic glass, and further comprises a connection surface which is arranged against a connection region of the case element so as to establish a permanent, water-resistant connection with the case element, and wherein said pushbutton is shaped in such a way that at least one portion of said actuating surface is able to move, with respect to said connection surface, in response to a pressure exerted by the user on said actuating surface.

2. The case element of claim 1, wherein said permanent water-resistant connection is established by direct contact between said connection surface of said pushbutton and said connection region of the case element, without a seal being interposed therebetween.

3. The case element of claim 1, wherein said tube of said pushbutton extends as far as said inner wall of the case element and bears a base at the tube's end located inside the case element, said base bearing said connection surface and being shaped in such a way that said connection surface presses against said inner wall of the case element all around said through-hole so as to establish said permanent water-resistant connection.

4. The case element of claim 2, wherein said tube of said pushbutton extends as far as said inner wall of the case element and bears a base at the tube's end located inside the case element, said base bearing said connection surface and being shaped in such a way that said connection surface presses against said inner wall of the case element all around said through-hole so as to establish said permanent water-resistant connection.

5. The case element of claim 1, wherein said connection surface of said pushbutton is welded, adhesively bonded or brazed onto said connection region of the case element.

6. The case element of claim 3, wherein said connection surface of said pushbutton is welded, adhesively bonded or brazed onto said connection region of the case element.

7. The case element of claim 1, wherein said one portion of said actuating surface that is able to move with respect to said connection surface is secured to a stem extending towards the inside of the case element, said stem being intended to actuate the timepiece mechanism in response to a pressure exerted by the user on said actuating surface.

8. The case element of claim 3, wherein said one portion of said actuating surface that is able to move with respect to said connection surface is secured to a stem extending towards the inside of the case element, said stem being intended to actuate the timepiece mechanism in response to a pressure exerted by the user on said actuating surface.

9. The case element of claim 1, wherein said pushbutton is arranged in such a way that said one portion of said actuating surface that is able to move with respect to said connection surface is able to move through a distance of between 0.1 and 1 mm with respect to the case element, in response to an applied pressure of between 2 and 10 N.

10. The case element of claim 3, wherein said pushbutton is arranged in such a way that said one portion of said actuating surface that is able to move with respect to said connection surface is able to move through a distance of between 0.1 and 1 mm with respect to the case element, in response to an applied pressure of between 2 and 10 N.

11. The case element of claim 1, wherein at least said connection region of the case element is made of a bulk metallic glass or of a metal taken from the group including gold or gold alloys, steels, titanium, platinum, palladium, tantalum and bronzes.

12. The case element of claim 1, wherein said pushbutton is made of a bulk metallic glass taken from the group including the bulk metallic glasses of palladium, of zirconium, of copper, of magnesium and of platinum.

13. The case element of claim 3, wherein said pushbutton is made of a bulk metallic glass taken from the group including the bulk metallic glasses of palladium, of zirconium, of copper, of magnesium and of platinum.

14. The case element of claim 4, wherein said pushbutton is made of a bulk metallic glass taken from the group including the bulk metallic glasses of palladium, of zirconium, of copper, of magnesium and of platinum.

15. The case element of claim 7, wherein said pushbutton is made of a bulk metallic glass taken from the group including the bulk metallic glasses of palladium, of zirconium, of copper, of magnesium and of platinum.

16. The case element of claim 11, wherein said pushbutton is made of a bulk metallic glass taken from the group including the bulk metallic glasses of palladium, of zirconium, of copper, of magnesium and of platinum.

17. The case element of claim 1, wherein the case element constitutes a middle for a timepiece.

18. The case element of claim 3, wherein the case element constitutes a middle for a timepiece.

19. A timepiece including a case element comprising an inner wall and an outer wall and having a through-hole extending between said inner wall and said outer wall, said case element bearing a pushbutton comprising a tube that is at least partially accommodated inside said through-hole and is closed by an actuating surface at the tube's end oriented towards the outside of said case element, said actuating surface being intended to be pressed by a user in order to actuate a timepiece mechanism that can be arranged inside said case element, wherein said pushbutton is made in one piece, of a bulk metallic glass, and further comprises a connection surface which is arranged against a connection region of said case element so as to establish a permanent, water-resistant connection with said case element, and wherein said pushbutton is shaped in such a way that at least one portion of said actuating surface is able to move, with respect to said connection surface, in response to a pressure exerted by the user on said actuating surface.

20. The timepiece of claim 19, wherein said tube of said pushbutton extends as far as said inner wall of said case element and bears a base at the tube's end located inside said case element, said base bearing said connection surface and being shaped in such a way that said connection surface presses against said inner wall of said case element all around said through-hole so as to establish said permanent water-resistant connection.

21. The timepiece of claim 19, wherein said pushbutton is made of a bulk metallic glass taken from the group including the bulk metallic glasses of palladium, of zirconium, of copper, of magnesium and of platinum.

22. A method for producing a case element, for a timepiece, bearing a pushbutton having, at the pushbutton's end oriented towards the outside of the case element, an actuating surface that is intended to be pressed by a user in order to actuate a timepiece mechanism that can be arranged inside the case element, the mechanical connection between the case element and said pushbutton being water-resistant, wherein the method comprises the following steps:

providing a case element comprising an inner wall and an outer wall and having a through-hole extending between said inner wall and outer wall, creating a pushbutton made of a bulk metallic glass, in one piece, comprising a tube that is closed by said actuating surface at one of the tube's ends and bears a connection surface which is designed to provide the connection between said pushbutton and said case element, said pushbutton being shaped in such a way that at least one portion of said actuating surface is able to move, with respect to said connection surface, in response to a pressure exerted by the user on said actuating surface, arranging said tube of said pushbutton at least partially inside said through-hole of said case element, said actuating surface being oriented towards the outside of said case element, and said connection surface being pressed against a connection region of said case element, securing said connection surface of said pushbutton to said connection region of said case element by creating a permanent water-resistant connection between them.

23. The method of claim 22, wherein said pushbutton is created by moulding.

24. The method of claim 22, wherein said pushbutton is created in such a way that said tube extends as far as said inner wall of the case element and bears a base at the tube's end located inside said case element, said base bearing said connection surface and being shaped in such a way that said connection surface presses against said inner wall of said case element, all around said through-hole, so as to establish said permanent water-resistant connection.

25. The method of claim 24, wherein said pushbutton is created by moulding, and wherein said pushbutton is produced simultaneously with other similar or identical pushbuttons, these pushbuttons being produced in the form of a batch of pushbuttons that are secured to one another via their base, said pushbuttons being subsequently split apart by implementing at least one cutting operation to separate said bases from one another.

26. The method of claim 22, wherein said permanent water-resistant connection is created by welding, adhesive bonding or brazing between said connection surface and said connection region.

27. The method of claim 24, wherein said permanent water-resistant connection is created by welding, adhesive bonding or brazing between said connection surface and said connection region.

28. The method of claim 22, wherein said one portion of said actuating surface that is able to move with respect to said connection surface is created so as to be secured to a stem extending towards the inside of the case element, said stem being intended to actuate the timepiece mechanism in response to a pressure exerted by the user on said actuating surface.

29. The method of claim 24, wherein said one portion of said actuating surface that is able to move with respect to said connection surface is created so as to be secured to a stem extending towards the inside of the case element, said stem being intended to actuate the timepiece mechanism in response to a pressure exerted by the user on said actuating surface.

30. The method of claim 22, wherein at least said connection region of said case element is made of a bulk metallic glass or of a metal taken from the group including gold or gold alloys, steels, titanium, platinum, palladium, tantalum and bronzes.

31. The method of claim 22, wherein said pushbutton is made of a bulk metallic glass taken from the group including the bulk metallic glasses of palladium, of zirconium, of copper, of magnesium and of platinum.

32. The method of claim 24, wherein said pushbutton is made of a bulk metallic glass taken from the group including the bulk metallic glasses of palladium, of zirconium, of copper, of magnesium and of platinum.

33. The method of claim 26, wherein said pushbutton is made of a bulk metallic glass taken from the group including the bulk metallic glasses of palladium, of zirconium, of copper, of magnesium and of platinum.

34. The method of claim 30, wherein said pushbutton is made of a bulk metallic glass taken from the group including the bulk metallic glasses of palladium, of zirconium, of copper, of magnesium and of platinum.

* * * * *